Nov. 12, 1957 — L. P. WESTON — 2,812,618
SEED AND FERTILIZER TAPE
Filed March 29, 1955

INVENTOR.
Lawrence P. Weston
BY Victor J. Evans & Co.
ATTORNEYS

United States Patent Office 2,812,618
Patented Nov. 12, 1957

2,812,618

SEED AND FERTILIZER TAPE

Lawrence P. Weston, Gibbon, Nebr.

Application March 29, 1955, Serial No. 497,571

2 Claims. (Cl. 47—56)

This invention relates to devices for facilitating seed planting, particularly where uniform spacing of plants is desirable such as in a field of corn, and in particular a double walled tape having continuous rows or channels extended longitudinally therethrough with seed in combination with an insect destroying material in one channel and with channels of fertilizer above and below the channel in which the seed are positioned and also in which the upper and lower edges of the walls are provided with flanges which prevent growth of weeds between rows of plants and also between the plants in the rows.

The purpose of this invention is to facilitate seed planting by providing tape with seeds equally spaced therein whereby the positions of plants in a row or field may be accurately determined.

With the conventional method of planting seeds, the seed are purchased in bulk and dropped into the ground with various types of planters or by hand and by this method many of the seed are lost. With this thought in mind this invention contemplates purchasing tapes of seed with the tape sold by the foot or yard instead of by the package or sack and the seed are planted by inserting strips in which, the seed in combination with fertilizer and insect repellants are positioned in the ground.

The object of this invention is, therefore, to provide means for forming an improved seed tape whereby seed embedded in the tape are surrounded with insect destroying materials and fertilizer so that plants growing from the seed are fed from the start.

Another object of the invention is to provide an improved seed tape in which upper edges of the tape are adapted to extend laterally to cover soil at both sides of the tape.

A further object of the invention is to provide an improved seed tape wherein seed surrounded by insect destroying materials and fertilizer are positioned between spaced walls with flanges on upper and lower edges and wherein the flange on the lower edge of one wall is spaced above the flange on the lower edge of the other wall to provide a root channel and wherein the flanges extended from the upper edges of the walls are positioned to rest upon soil to prevent growth of weeds and the like.

Other features and advantages of the invention will appear from the following description taken in connection with the drawing, wherein.

Figure 1:
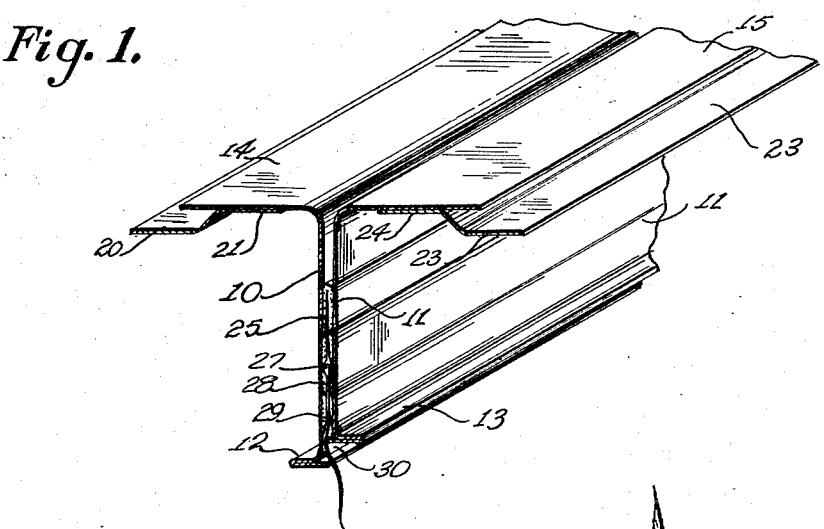
Figure 1 is a perspective view showing a section through the improved seed and fertilizer tape, with flanges extended from upper edges of the walls of the tape and adapted to be placed upon the soil and with spaced flanges on the lower edges of the tape providing a root escape outlet in one side of the tape.

Referring now to the drawing wherein reference characters denote corresponding parts the improved seed and fertilizer tape of this invention includes strips of tape having intermediate sections 10 and 11 with a flange 12 on the lower end of the section 10, a flange 13 on the lower end of the section 11, a flange 14 on the upper edge of the section 10 and a flange 15 on the upper edge of the section 11.

Figure 3:
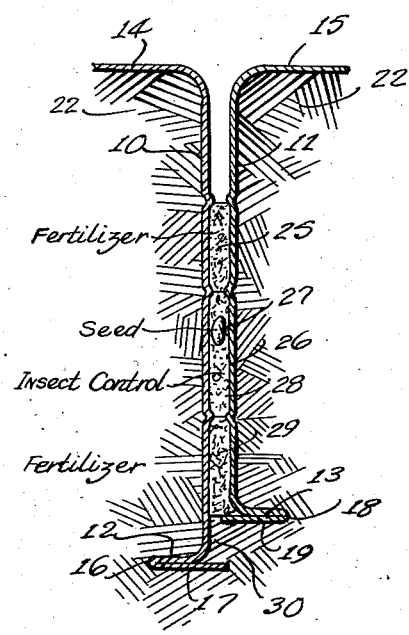
Figure 3 is a section similar to that shown in Fig. 2 with the plant omitted and illustrating the relative positions of the seeds, insect repellant material and fertilizer between walls of the tape and with the parts shown on an enlarged scale.

As illustrated in Fig. 3 the flange 12 is folded under at the point 16 providing a foot or lower section 17 folded against the lower surface of the flange 12. Also as noted in Fig. 3 the flange 13 is folded at the point 18 with a section 19 thereof positioned against the lower surface of the flange 13.

Figure 2:
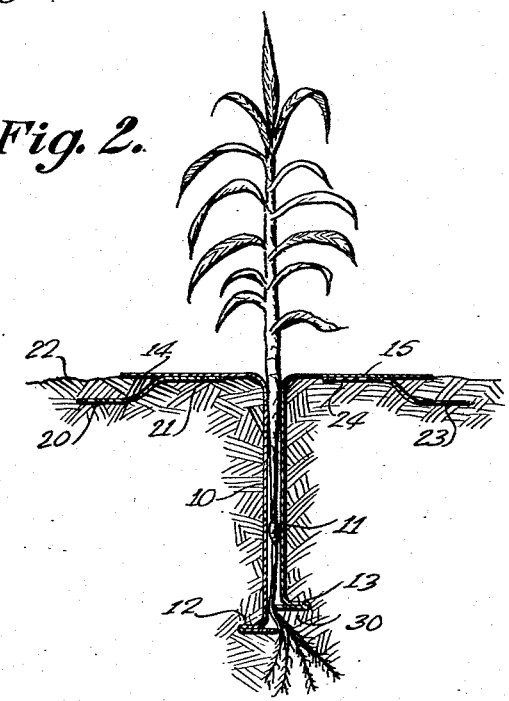
Figure 2 is a cross section through the improved seed and fertilizer tape illustrating the growth of a plant from a seed positioned between the walls of the tape.

As noted in Figs. 1 and 2 the flange 14 extended from the upper edge of the intermediate section 10 of one strip is provided with an anchoring skirt 20 that is secured to the lower surface of the flange 14 with a flange 21 and with the skirt 20 inserted in soil, as indicated by the numeral 22 anchoring means is provided whereby the flange 14 and also the intermediate portion 10 of the tape is securely held in the ground.

The flange 15 is also provided with a skirt 23 that is secured to the under surface of the flange 15 with a flange 24 and with the skirt 23 embedded in the ground the flange 15 and intermediate section 11 are also anchored in position.

With the parts assembled, particularly as illustrated in Fig. 3 an upper area or channel 25 is filled with a suitable fertilizer, an intermediate area or channel 26 in which seed, as indicated by the numeral 27 may be positioned, is filled with an inset control or destroying material, as indicated by the numeral 28 and a lower area or channel 29 positioned below the channel 26 is also filled with a suitable fertilizer.

For storage and shipping purposes the flanges 12 and 13 at the lower edge and the flanges 14 and 15 with the skirts 20 and 23 are folded to flat positions whereby the tape may be rolled to facilitate storing and shipping and it will be understood that the tape may be fed into a channel in the soil from a roll with a plow or other planting device.

After the tape with the seed, fertilizer, and insect destroying material has been in the ground a certain period of time the seeds sprout, as illustrated in Fig. 1 with the plant and leaves extended upwardly above the ground and with the roots extended through an opening, such as the opening 30 between the flanges 12 and 13 at the lower edges of the side walls 10 and 11 with the roots extended as illustrated in Fig. 2. During this period the material of which the tape is formed disintegrates, disappearing into the soil.

The flanges 14 and 15 at the upper edge of the tape may be formed of material that remains in place until the plants are substantially grown whereby weeds and the like are smothered and continuous working of the plants is not required.

With seed equally spaced in the area between the areas containing fertilizer or in the seed channel tapes may be inserted in the soil and with the tapes parallel and equally spaced and also started from a common point plants, such as corn may be equally spaced in both directions whereby the hills of corn will be positioned in rows that may be plowed both longitudinally and transversely to substantially eliminate weeds.

It will be understood that modifications, within the scope of the appended claims, may be made in the design and arrangement of the parts without departing from the spirit of the invention.

What is claimed is:

1. A seed and fertilizer tape comprising spaced strips of material having a continous seed channel with seeds therein positioned between the strips, with continuous channels containing fertilizer on each side of the seed channel, and with flanges extended from the edges of the strips at both sides of the tape, said seed channel also containing an insect repellant, said flanges at one side of the tape having anchoring skirts thereon and adapted to be positioned upon the surface of the ground with the strips of material in the ground and with the anchoring skirts also buried in the ground, and the flanges on the opposite edges of the strips being spaced vertically providing a root escape channel between said flanges.

2. In a seed and fertilizer tape, the combination which comprises spaced strips of material having an area filled with an insect destroying material and seed extended longitudinally thereof and parallel to the edges of the strips, areas containing fertilizer on both sides of the area containing seed and insect destroying material and said strips having flanges on the edges with the flanges on one side of the tape adapted to be positioned upon the soil and having skirts adapted to be embebded in the soil and with the flanges on the opposite edges positioned in vertically spaced relation whereby a root escape channel is provided between said flanges.

References Cited in the file of this patent

UNITED STATES PATENTS

| | | |
|---|---|---|
| 1,143,980 | McComb | June 22, 1915 |
| 1,910,828 | Flanders | May 23, 1933 |
| 2,226,812 | Goldberg | Dec. 31, 1940 |
| 2,571,491 | Schindler | Oct. 16, 1951 |

FOREIGN PATENTS

| | | |
|---|---|---|
| 488,392 | Great Britain | July 6, 1938 |